UNITED STATES PATENT OFFICE.

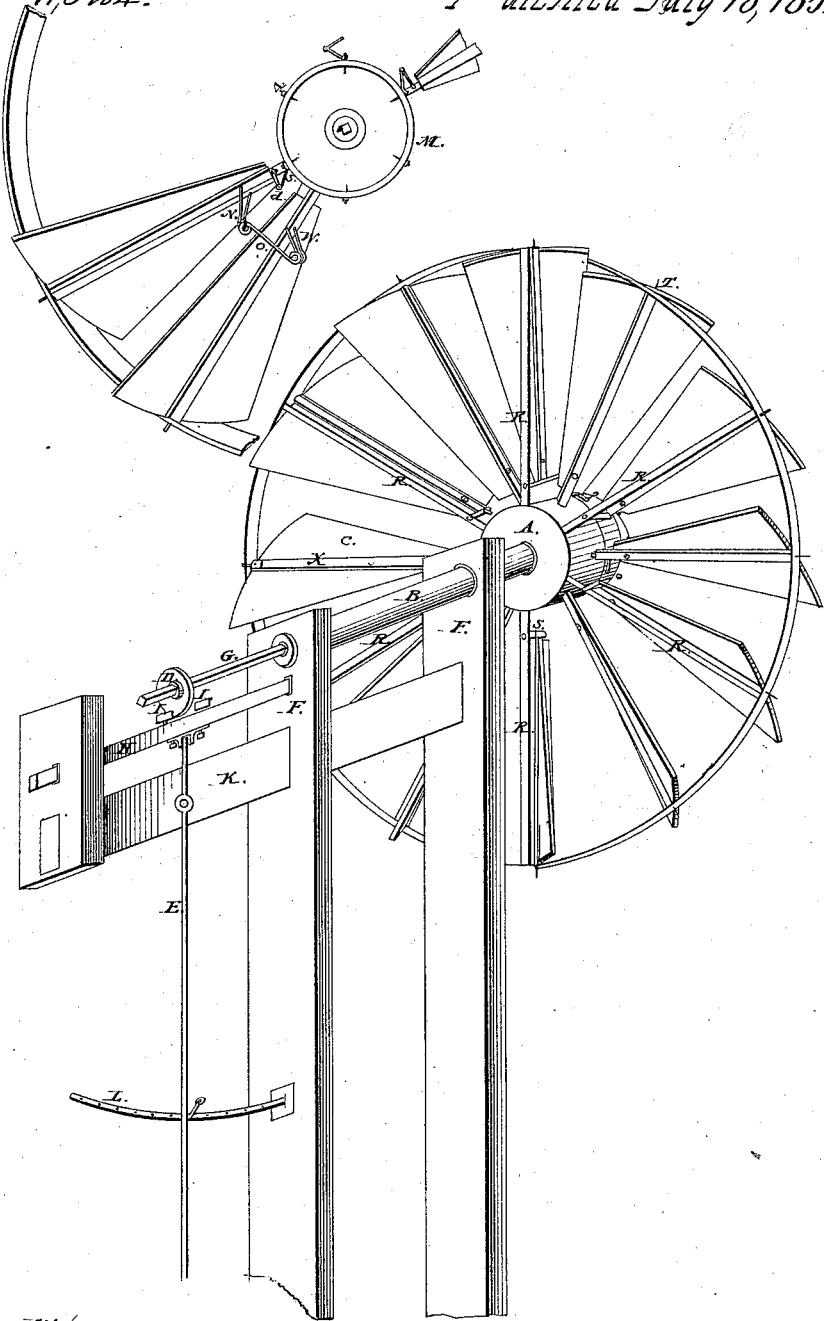

JACOB ERDLE, OF WEST BLOOMFIELD, NEW YORK.

WINDMILL.

Specification of Letters Patent No. 11,324, dated July 18, 1854.

*To all whom it may concern:*

Be it known that I, JACOB ERDLE, of West Bloomfield, county of Ontario, and State of New York, have invented a new Improved Machine for Propelling Any Desired Machine by Air-Power, called the "Air-Machine;" and I do hereby declare that the following is a full and exact description thereof, reference being had to the accompanying drawings and the letters of reference marked thereon.

The nature of my invention consists of a wheel hung on two posts F F. This wheel is filled with fans or wings with a hollow shaft B and a hub A open at one end and a flat rim J, around the outside of the wheel, with six spokes or arms from the hub A to the rim J of the wheel. Near the hub A in each spoke R is a stud S, that extends to the end of the hub, a hole in the end of the stub S, to receive a pivot or bearing T from small end of every other wing C and the pivot or bearing on the other rings next at the small end the pivot passes through the edge of the open hub or hollow hub A. The other end of each wing has a pivot or bearing that passes through the rim J of the wheel. The wings in this position can turn around, and in order to set the wings to the wind and keep them there or change sides of the wings or close them up to stop the wheel it is so constructed by means of a stud S placed on the edge of the wing near the hub A and a link U from the eye P of the stud P to a pin V or Eye or pin in the edge of a sort of a pulley M, on the end of the square piston rod that passes through the hollow shaft B that on moving the square piston G shaft work back and forth turns and sets the fans to the wind by means of a lever E extending down and hung on a girt K to the 2 posts F to vibrate the square shaft G in and out by means of a friction pulley D on the end of square shaft, that operates between two other friction pulleys I fixed on a slide H. This lever E is attached to operate the square shaft aforesaid by hand or by a regulator L at the lower end of the lever E. The other half of the wings stand on the shell hub A with a pivot T at each end of wings and turns around also by means of an eyed stud P extending out a proper length from the flat N extending out a proper distance from the flat side of the wing that has a stud P in the edge, a link O, from this stud to a like stud W in the next wing to it in like manner. Now all the wings are connected to one another and to the pulley M on the end of the square piston rod that passes through the hollow shaft of the wheel by a regulator L attached to the lower end of the lever E will operate these wings to start the wheel or stop it, and to keep up a regular motion at pleasure. The lever E turns on a pin on the girt K the upper end of the lever placed in a notch made of cast iron and screwed to the slide H to move the girt that operates the piston shaft G by the two friction pulleys I on the friction pulley D to change the wings in the wheel at any desired motion or stop the wheel by closing up the fans.

To enable others skilled in the art to make and use my improvement I will proceed to describe its construction and operation.

I construct my machine for air to propel the same: First the two posts F attach to some frame or building of sufficient height agreeable to the size wheel the shaft B from 6 to 10 feet long, the hub A on shaft B from 2 to 3 feet diameter C as A hollow and 6 to 7 inches wide and open at one end—the shaft B from 5 to 8 inches diameter according to the size of the wheel—the wheel can be from 12 to 36 feet and over and 12 or more wings or fans calculated to fill up the wheel—the fans C can be made a frame and covered with canvas or boards—the pivots T or bearings on each end of the wings are made of ¾ to inch round iron entered into a banded timber X in the center of the wings. The rim J, that circumferences the wheel is of wood bent round the wheel from 1½ inch thick to 2 inches thick—from 12 to 18 inches wide. The shaft B placed on the top of the 2 posts and bearings are placed in proper sized boxes for the same. The friction pulley D on the square piston shaft is 10 inches diameter—there is 2 friction pulleys I placed on a slide operated by lever E on each side of pulley D are 6 inches diameter 2 inches thick the arm to hold the lever at any required spot to keep the wheel at the same motion.

What I claim as my improvement and desire to secure by Letters Patent is—

The manner or mode of filling the whole wheel with pans or wings which causes the wheel to be more powerful than it otherwise could be, as it receives the power from the whole current of air that strikes within its circle and the mode or form of regulating stopping and starting the wheel through the center of the main shaft.

JACOB ERDLE.

Witnesses:
S. H. WOOD,
ALVAH L. WOOD.